United States Patent
Nadler

(10) Patent No.: US 11,664,971 B2
(45) Date of Patent: May 30, 2023

(54) ENCRYPTED COMMUNICATION BETWEEN COMPONENTS OF WELDING AND CUTTING SYSTEMS

(71) Applicant: The ESAB Group Inc., Florence, SC (US)

(72) Inventor: Michael Nadler, Wilmot, NH (US)

(73) Assignee: The ESAB Group Inc., North Bethesda, MD (US)

(*) Notice: Subject to any disclaimer, the term of this patent is extended or adjusted under 35 U.S.C. 154(b) by 354 days.

(21) Appl. No.: 16/682,310

(22) Filed: Nov. 13, 2019

(65) Prior Publication Data
US 2021/0143976 A1    May 13, 2021

(51) Int. Cl.
| | |
|---|---|
| G06F 21/00 | (2013.01) |
| H04L 29/06 | (2006.01) |
| H04L 9/06 | (2006.01) |
| H04W 12/037 | (2021.01) |
| H04B 1/02 | (2006.01) |
| H04B 1/06 | (2006.01) |
| H04L 9/14 | (2006.01) |
| G06V 20/10 | (2022.01) |

(52) U.S. Cl.
CPC ............ H04L 9/0618 (2013.01); G06V 20/10 (2022.01); H04B 1/02 (2013.01); H04B 1/06 (2013.01); H04L 9/14 (2013.01); H04W 12/037 (2021.01); G06V 2201/06 (2022.01); H04L 2209/80 (2013.01)

(58) Field of Classification Search
CPC ..... H04L 9/0618; H04L 9/14; H04L 2209/80; G06K 9/00664; G06K 2209/19; H04B 1/02; H04B 1/06; H04W 12/037; B23K 9/32; B23K 37/006; B23K 10/006
See application file for complete search history.

(56) References Cited

U.S. PATENT DOCUMENTS

| | | | |
|---|---|---|---|
| 5,276,305 A | | 1/1994 | Hsien |
| 7,381,922 B2 | | 6/2008 | Ulrich |
| 9,395,715 B2 | | 7/2016 | Brandt et al. |
| 9,712,947 B2 | | 7/2017 | Dina et al. |
| 9,737,954 B2 | | 8/2017 | Hoffa et al. |
| 2004/0139348 A1 | * | 7/2004 | Norris, Jr. ............ G06Q 20/327 713/186 |
| 2013/0263420 A1 | | 10/2013 | Shipulski et al. |

(Continued)

OTHER PUBLICATIONS

"Beware of Bad Bargains", Fabricating and Metalworking, Aug. 1, 2014. pp. 1-10. Retrieved Aug. 17, 2022 from https://www.fabricatingandmetalworking.com/2014/08/beware-of-bad-bargains/.*

(Continued)

*Primary Examiner* — Lisa C Lewis
(74) *Attorney, Agent, or Firm* — Edell, Shapiro & Finnan, LLC

(57) ABSTRACT

Apparatus and methods associated with the authentication of a welding or cutting torch with a power supply are provided. According to some implementations, the authentication includes encryption/decryption techniques initiated by the physical or virtual closure of one or more of a trigger switch and a parts-in-place switch. The delivery of high voltage welding or cutting power from the power supply to the torch being enabled only upon a successful authentication of the torch with the power supply.

18 Claims, 16 Drawing Sheets

(56) References Cited

U.S. PATENT DOCUMENTS

| | | |
|---|---|---|
| 2013/0264317 A1 | 10/2013 | Hoffa et al. |
| 2013/0264320 A1 | 10/2013 | Shipulski et al. |
| 2014/0069895 A1 | 3/2014 | Brine |
| 2014/0266576 A1* | 9/2014 | Hillen .................... B23K 9/32 340/5.2 |
| 2016/0165712 A1 | 6/2016 | Zhang et al. |
| 2016/0221108 A1 | 8/2016 | Hoffa et al. |
| 2017/0042014 A1 | 2/2017 | Sanders et al. |
| 2018/0232545 A1 | 8/2018 | Hoffa et al. |
| 2019/0022952 A1* | 1/2019 | Jansson .................. B29C 65/04 |
| 2019/0070689 A1* | 3/2019 | Bunker ................. B23K 9/173 |
| 2019/0199101 A1* | 6/2019 | Hennesy ............... H02J 7/0045 |
| 2021/0053140 A1* | 2/2021 | Williams ................ G06F 21/44 |

OTHER PUBLICATIONS

Notification of Transmittal of International Search Report and Written Opinion including International Search Report and Written Opinion for International Application No. PCT/US2020/059910 dated Mar. 16, 2021, 13 pages.

\* cited by examiner

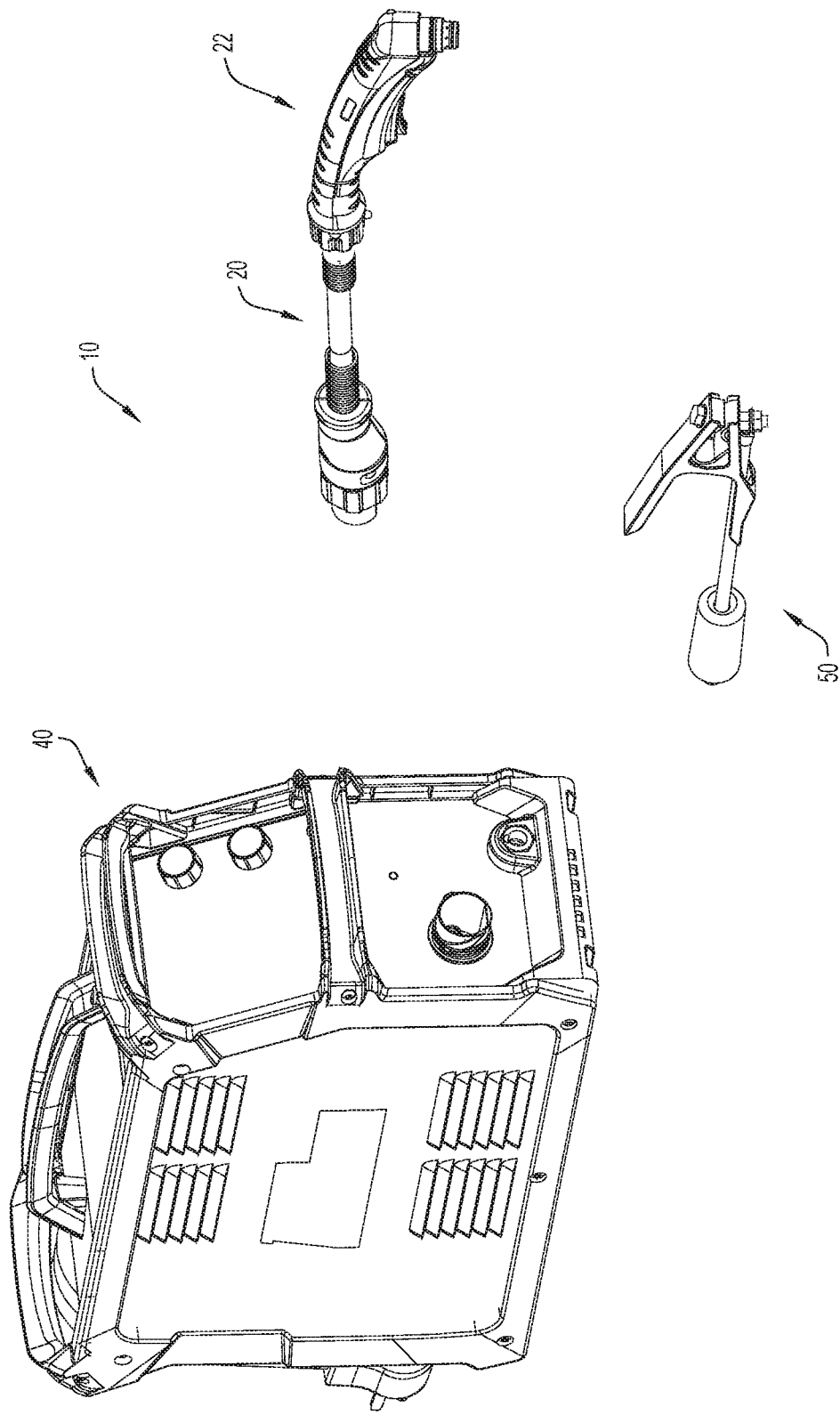

ENCRYPTED COMMUNICATION BETWEEN COMPONENTS OF WELDING AND CUTTING SYSTEMS

TECHNICAL FIELD

The present disclosure is directed towards using encrypted communications between components of welding and cutting systems to prohibit the use of unintended parts in such systems.

BACKGROUND

Many welding and cutting torches, such as plasma cutting torches, now include torch bodies that can receive a variety of consumables (e.g., welding tips, cutting tips, and/or a variety of electrodes), as well as other interchangeable torch components. Consequently, a single torch body may be able to be used for a variety of cutting and/or welding operations (with different tips, electrodes, and/or other interchangeable/ consumable components being installed for different operations). Unfortunately, different interchangeable torch components (e.g., different torch tips and different electrodes) often require different operational settings. Thus, different interchangeable torch components (e.g., torch tips and/or electrodes) must be identified before or during installation onto the torch body (or at least prior to a torch operating). Additionally, a power supply connected to the torch body usually needs to be adjusted when the torch is used with different components.

Commonly owned application Ser. No. 16/448,903, filed Jun. 21, 2019, which is incorporated by reference herein in its entirety, discloses assemblies and methods associated with ensuring genuine parts (e.g. consumables) are assembled on a cutting or welding torch before operationally enabling the torch to perform a cutting operation. That is, the torch is prevented from operating, or is otherwise permitted to operate with limited capabilities, when non-genuine parts are assembled on the torch.

SUMMARY

The present disclosure is directed towards requiring a welding/cutting power supply to receive and confirm an authentication message from a welding/cutting torch to which it is operationally connected before delivering welding/cutting power to the torch. According to one implementation the authentication confirms that both the torch and/or the consumable components attached thereon are genuine parts and operates to enable the power supply to delivery high voltage welding/cutting voltage to the torch.

According to one implementation, the torch includes a trigger switch that is directly or indirectly influenced by the user of the torch to assume an open or closed position. The trigger switch may be a physical switch or a virtual switch. When in the open position, the trigger switch directly or indirectly prevents the delivery of welding/cutting power to those components of the torch configured to carry out the welding/cutting operation. When in the closed position, the trigger switch conditionally enables the delivery of welding/cutting power to those components of the torch configured to carry out the welding/cutting operation, the condition depending on whether or not the torch is authenticated for use with the power supply.

According to one implementation, the authentication is carried out in part by use of a first data module located inside the torch. According to one implementation, the first data module is configured to generate first authentication data, or obtain first authentication data from a memory device, in response to a received signal (i.e. closed signal) indicative of the trigger switch assuming the closed position. Thereafter, the first data module encrypts the first authentication data to produce trigger ciphertext intended for being sent to the power supply. Alternatively, the first authentication data may have been previously encrypted inside or outside the torch and the resultant trigger ciphertext stored in the first memory device. In such instances, the first data module need not be endowed with encryption capabilities and need only retrieve the trigger ciphertext from memory in response to receiving the trigger switch closed signal.

In any of the implementations disclosed above, the obtained trigger ciphertext is transmitted to a first authentication module in the power supply using a wired or wireless connection. According to one implementation, the first authentication module includes a memory and a processor that executes instructions stored in the memory to carry out a decryption of the trigger ciphertext received from the torch to produce first output data. According to one implementation, the decryption algorithm used to decrypt the trigger ciphertext uses the same key (e.g. a private key) as that used to produce the trigger ciphertext. According to other implementations, the keys are not the same but are logically linked (e.g. paired public and private keys).

Upon the first output data being produced, the processor compares the first output data to the first authentication data previously stored in the first authentication module memory, or another memory accessible by the processor. In response to the first output data matching the first authentication data the power supply is enabled to deliver welding/cutting power to the torch. If, on the other hand, the first output data does not match the first authentication data, the power supply is prevented from delivering welding/cutting power to the torch.

According to other implementations, an authenticated encryption scheme is used in which the first authentication module is configured to recognize if the trigger ciphertext received from the torch is properly constructed. According to such implementations, the first authentication module processor carries out instructions stored in the memory for determining if the trigger ciphertext received from the torch is properly constructed. If the trigger ciphertext is determined to be improperly constructed, the processor does not decrypt the trigger ciphertext, but instead outputs what is referred to as a "bottom symbol", which according to one implementation comprises data that does not match the first authentication data. In such an instance, the power supply is disabled from delivering welding/cutting power to the torch. In instances when the ciphertext is determined to be properly constructed, the processor carries out the decryption of the trigger ciphertext as disclosed above.

In some instances, the welding/cutting torch includes one or more interchangeable torch components and includes means for determining whether or not the one or more consumable parts are genuine (i.e., produced by a known or pre-approved manufacturer). According to one implementation, the torch includes a torch body and one or more imaging devices. The torch body has an operative end configured to removably receive the one or more interchangeable torch components including one or more markings. According to one example, the torch body defines an internal cavity with the one or more imaging devices disposed and positioned therein to optically acquire an image or image data representative of the one or more markings included on the one or more interchangeable torch components so that the one or more interchangeable torch components can be automatically recognized and determined to be genuine or not based on the one or more markings. Other methods for determining if the interchangeable torch components are genuine may also be carried out.

According to some implementations, authentication of the torch with the power supply is carried out by a first authentication scheme through the use of a parts-in-place (PIP) switch and not the trigger switch. However, according to other implementations, authentication of the torch with the power supply is achieved by a second authentication scheme through use of both a trigger switch and a PIP switch.

According to the first authentication scheme, the torch includes a PIP switch that is operative to transition from an open position to a closed position when the one or more interchangeable torch components are determined to be genuine. The PIP switch may be a physical switch or a virtual switch. According to one implementation, the torch includes a second data module that is configured to generate second authentication data, or obtain second authentication data from a memory device, in response to a received signal (i.e. closed signal) indicative of the PIP switch assuming the closed position. Thereafter, the second data module encrypts the second authentication data to produce PIP ciphertext intended for being sent to the power supply. Alternatively, the second authentication data may have been previously encrypted inside or outside the torch and the resultant PIP ciphertext stored in the memory device of the second data module. In such instances, the second data module need not be endowed with encryption capabilities and need only retrieve the PIP ciphertext in response to receiving the parts-in-place switch closed signal.

Regardless of how the PIP ciphertext is obtained, it is transmitted to a second authentication module in the power supply using a wired or wireless connection. According to one implementation, the second authentication module includes a memory and a processor that executes instructions stored in the memory to carry out a decryption of the PIP ciphertext received from the torch to produce second output data. According to one implementation, the decryption algorithm used to decrypt the PIP ciphertext uses the same key (e.g. a private key) as that used to produce the PIP ciphertext. According to other implementations, the keys are not the same but are logically linked (e.g. paired public and private keys).

Upon the second output data being produced, the processor compares the second output data to the authentication data previously stored in the second authentication module memory, or another memory accessible by the processor. In response to the second output data matching the authentication data, the power supply is enabled to deliver welding/cutting power to the torch. If, on the other hand, the output data does not match the authentication data, the power supply is disabled from delivery welding/cutting power to the torch.

According to other implementations, an authenticated encryption scheme is used in which the second authentication module is configured to recognize if the PIP ciphertext received from the torch is properly constructed. According to such implementations, the second authentication module processor carries out instructions stored in the memory for determining if the PIP ciphertext received from the torch is properly constructed. If the PIP ciphertext is determined to be improperly constructed, the processor does not decrypt the PIP ciphertext, but instead outputs what is referred to as a "bottom symbol", which according to one implementation comprises data that does not match the second authentication data. In such an instance, the power supply is disabled from delivering welding/cutting power to the torch. In instances when the PIP ciphertext is determined to be properly constructed, the processor carries out the decryption of the PIP ciphertext as disclosed above.

As noted above, according to some implementations authentication of the torch with the power supply is achieved by a second authentication scheme through use of both a trigger switch and a PIP switch. According to such implementations, the trigger ciphertext and the PIP ciphertext may be respectively obtained through the use of first and second data module located in the torch as disclosed above and respectively transmitted to the first and second authentication modules in the power supply. According to such implementations, authentication of the torch with the power supply is achieved if the first authentication modules produces first output data that matches the first authentication data and if the second authentication modules produces second output data that matches the second authentication data. In such an event, the power supply is enabled to supply welding/cutting power to the torch. If, however, the first output data does not match the first authentication data or the second output data does not match the second authentication data, authentication fails and the power supply is prevented from supplying welding/cutting power to the torch.

In the course of implementing the second authentication scheme, the torch may comprise one data module that manages the obtaining of or production of both the trigger ciphertext and PIP ciphertext. In a like manner, the power supply may comprise one authentication module that processes both the trigger ciphertext and the PIP ciphertext.

Compliance indication other than that provided by a physical or virtual switch may also be used to evince whether or not the interchangeable torch components are genuine and to put into action the authentication process. For example, the authentication process may be initiated upon a processor executing logic to determine whether or not the interchangeable torch component is genuine. According to some implementations this is accomplished by a processor located inside the torch acquiring image data derived from an obtained image of markings or other indicia located on the interchangeable torch component and determining if the acquired image data matches image data stored in a library. If a match is made, a parts-in-place determination is made that results in the creation of PIP ciphertext according to any of the methods discussed above. According to one implementation, the PIP ciphertext is produced by an encryption of the matched image data stored in the library. That is, the matched image data stored in the library comprises the message used in the encryption algorithm. Thereafter, PIP authentication proceeds inside the power supply similar to that disclosed above with the PIP ciphertext being decrypted in the authentication module to produce output data that is used to determine whether or not the power supply is enabled to deliver or prevented from delivering welding/cutting power to the torch.

It is important to note that compliance indication may be accomplished using other methods.

BRIEF DESCRIPTION OF THE DRAWINGS

FIG. 1A is a perspective view of a cutting system including a power supply and torch assembly according to one implementation.

Like numerals identify like components throughout the figures.

DETAILED DESCRIPTION

Methods, apparatus and systems for authenticating a welding/cutting torch with a power supply are presented herein, along with methods, apparatus, and systems for automatically identifying interchangeable torch components, such as electrodes, torch tips and other consumables, for welding and/or cutting torch assemblies.

Figure 1B:
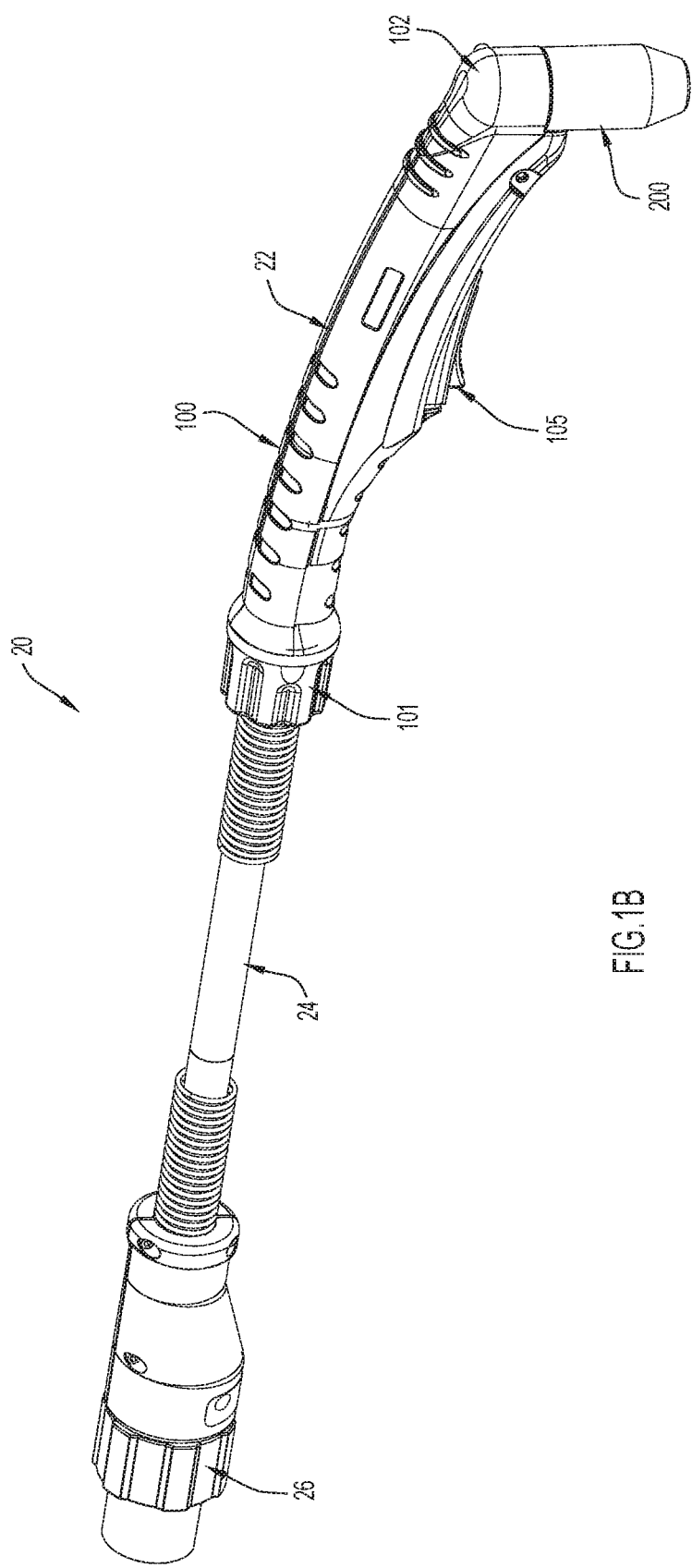
FIG. 1B is a perspective view of the torch assembly of FIG. 1A, according to an example implementation of the present disclosure.

FIG. 1A illustrates an example implementation of cutting system 10 that may implement the techniques presented herein. At a high-level, the cutting system 10 include a power supply 40 that is configured to supply (or at least control the supply of) power and gas to a torch 20. As is described in further detail below, the power supply 40 supplies gas and/or power to the torch 20 based on an authentication of the torch 20 with the power supply 40. The cutting system 10 also includes a working lead 50 with a grounding clamp. Although lead 50 and the lead 32 included in the torch assembly 20 (see FIG. 1B) are illustrated as being relatively short, the leads may be any length. Moreover, although not shown, a welding system configured to implement the techniques presented herein may include similar components.

FIG. 1B illustrates the torch 20 shown in FIG. 1A from an external perspective. As can be seen, the torch 20 includes a torch body 100 that extends from a first end 101 (e.g., a connection end 101) to a second end 102 (e.g., an operating or operative end 102). The connection end 101 of the torch body 100 may be coupled (in any manner now known or developed hereafter) to one end of lead 24 and the other end of lead 24 may be coupled to or include a connector 26 that allows the torch 20 to be coupled to the power supply 40 in any manner now known or developed hereafter (e.g., a releasable connection). Meanwhile, the operative end 102 of the torch body may receive interchangeable components, such as consumable components, which are generally denoted by item 200, but may include a variety of components, such as torch tips, electrodes, gas rings, etc., as is discussed in further detail below. The torch 20 may also include a trigger 105 that allows a user to initiate cutting operations.

Figure 1C:
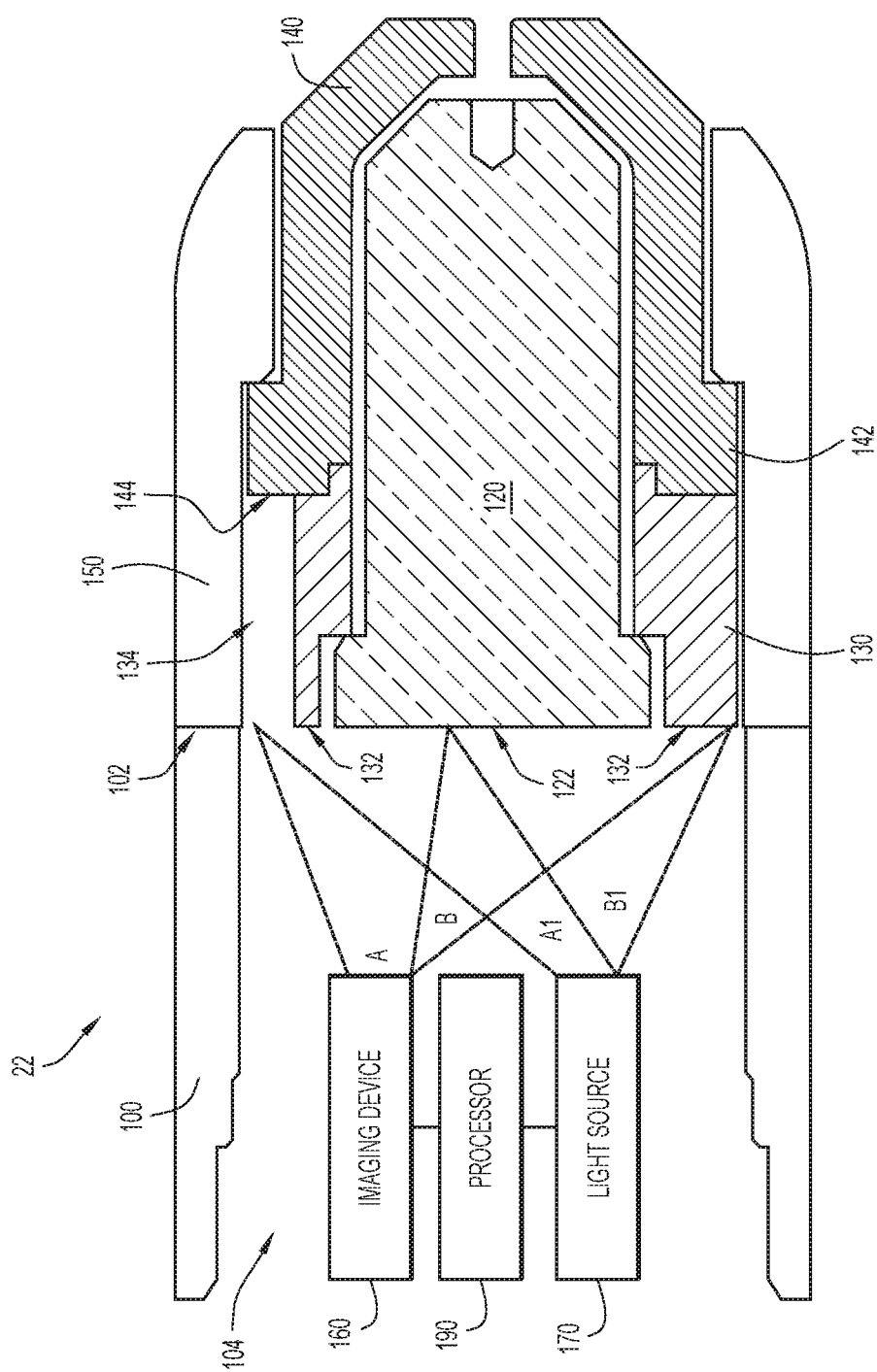
FIG. 1C is a sectional view of an end of the torch assembly of FIG. 1B that is configured to receive and automatically identify interchangeable torch components, according to an example implementation of the present disclosure.

FIG. 1C illustrates a portion of torch 20 that is proximate the operative end 102 of the torch body 100. For simplicity, FIG. 1C illustrates the torch body 100 without various components or parts, such as power or gas transfer components, that are typically included in a welding/cutting torch. Instead, FIG. 1C illustrates only select components or parts that allow for a clear and concise illustration of the techniques presented herein. However, it is to be understood that any unillustrated components that are typically included in a torch (i.e., components to facilitate welding or cutting operations) may (and, in fact, should) be included in a torch configured in accordance with an example implementation of the present invention.

In the depicted implementation, the torch body 100 receives an interchangeable electrode 120, an interchangeable gas distributor 130, an interchangeable torch tip 140, and an interchangeable shield cup 150, insofar as each of these components may be interchangeable for other like components and is not necessarily interchangeable or reconfigurable in and of itself. For example, the electrode 120 is interchangeable because it may be swapped for or replaced with another electrode (or another, similar consumable). In the depicted implementation, the gas distributor 130 and the electrode 120 can be installed onto the torch body 100 and the tip 140 can be installed there over. Alternatively, the electrode 120, the gas distributor 130, and the tip 140 can be installed onto the torch body 100 as a single component (e.g., as a cartridge). Either way, once the electrode 120, the gas distributor 130, and the tip 140 and are installed onto/into the torch body 100, the shield cup 150 secures these consumables to the operative end 102 of the torch body 100. For example, the shield cup 150 may be installed around an installation flange 142 of the torch tip 140 in order to secure the electrode 120, the gas distributor 130, and the torch tip 140 in place at (and in axial alignment with) an operative end 102 of the torch body 100. Alternatively, the shield cup 150 could be part of a cartridge that includes the electrode 120, the gas distributor 130, and the tip 140 and could include mating features that secure the cartridge to the operative end 102 of the torch body 100 in a proper or suitable alignment with the torch body 100.

However, in other implementations, the electrode 120, gas distributor 130, and/or torch tip 140 (as well as any other interchangeable torch components) can be secured or affixed to the torch body 100 in any desirable manner, such as by mating threaded sections included on the torch body 100 with corresponding threads included on the components. Moreover, in other implementations, the torch 20 may include any suitable combination of interchangeable torch components, in addition to or in lieu of the interchangeable electrode 120, the interchangeable gas distributor 130, the interchangeable torch tip 140, and/or the interchangeable shield cup 150.

Still referring to the example of FIG. 1C, the torch 20 also includes an imaging device 160 that, in the depicted implementation, is disposed within the torch body 100. More specifically, the torch body 100 defines an internal cavity 104 and the imaging device 160 is positioned within the internal cavity 104 so that the imaging device 160 can optically acquire one or more images of and/or image data representative of the operative end 102 of the torch body 100. That is, the imaging device 160 is positioned to optically acquire one or more images of and/or image data representative of interchangeable torch components installed on the operative end 102 of the torch body 100. In some implementations, the imaging device 160 need not have a direct line of sight to the operative end 102 and, instead, may view the operative end 102 of the internal cavity 104 via any optics components, such as mirrors, fiber optics, light pipes, etc. now known or developed hereafter. Put another way, the imaging device 160 may be optically coupled to the operative end 102 of the internal cavity 104 via any optics components now known or developed hereafter. In fact, in some implementations, the imaging device 160 need not be disposed within the torch 20 and can be disposed on or near an outer surface of the torch body 100 and optically coupled to the operative end 102 of the internal cavity 104. That being said, implementations with an internal imaging device 160 (i.e., an imaging device 160 disposed within internal cavity 104) may be sleeker, more efficient, and less likely to malfunction than implementations including an imaging device coupled to an exterior surface of the torch body 100 or otherwise disposed externally of the torch 20 (e.g., an "external imaging device 160").

Generally, the imaging device 160 may be any device or component capable of optically acquiring two-dimensional and/or three-dimensional images and/or image data representative of an image. For example, the imaging device 160 may be a single camera that captures two-dimensional images of any surfaces (and one or more markings included thereon) in its field of view. Additionally or alternatively, the imaging device 160 may include multiple imaging components, such as an array of cameras, multiple cameras, lasers, LIDAR, ultrasound, sonar, radar, infrared imaging device, etc., that allow the imaging device 160 to acquire two-dimensional images, three-dimensional images (e.g., to detect etchings, as is described in further detail below), and/or image data (e.g., data from an optical scan with a laser that is representative of an image).

As is illustrated in FIG. 1C, in some implementations the imaging device 160 may have a field of view "A" that spans only a portion (e.g., half) of the operative end 102 of the torch body 100, but, in other implementations, the imaging device 160 may have a field of view that spans the entire torch body 100 ("A"+"B"). As is explained in further detail below, in some implementations, the interchangeable torch components (e.g., consumable components) may be keyed to align any markings with a certain radial location of the torch body (e.g., a "top" of the torch body). In these implementations, it may only be necessary for the imaging device 160 to have a field of view "A" that covers the radial location (e.g., only have a field of view that covers a segment of the cylindrically-shaped torch body 100).

Moreover, in some implementations, the various components may include pathways, openings, or other such features (e.g., embedded fiber optics) to expand the field of view of an imaging device 160 beyond the components that are immediately adjacent to the imaging device 160. For example, in FIG. 1C the imaging device 160 has a direct line of sight to a back surface 122 of the electrode 120 and a back surface 132 of the gas distributor 130, but the imaging device 160 may not have a direct line of sight to a back surface 144 of the torch tip 140. Thus, the gas distributor 130 defines a pathway 134 (e.g., a fiber optics pathway) that provides the imaging device 160 with a line of sight to a specific portion of the back surface 144 of the torch tip. Consequently, in the depicted implementation, the imaging device is positioned to optically acquire one or more images of and/or image data representative of the back surface 122 of the electrode 120, the back surface 132 of the gas distributor 130, and the back surface 144 of the torch tip 140, regardless of whether the imaging device 160 has a field of vision defined by "A" or defined by "A"+"B."

In some implementations, the torch 20 may also include a light source 170 configured to illuminate a field of view (e.g., "A" or "A"+"B") of the imaging device 160. That is, if the imaging device 160 has a field of view "A," the light source 170 may illuminate at least the field of view "A", as is illustrated by "A1," and if the imaging device 160 has a field of view "A+B," the light source 170 may illuminate at least the field of view "A+B", as is illustrated by "A1+B1." The light source 170 may be any device that can illuminate surfaces of interchangeable torch components in a particular field of view, such as a light-emitting diode (LED). Additionally or alternatively, light emitted during operations of the torch (i.e., light emitted by a plasma arc) may supplement or replace light from the light source 170 included in or on the torch body 100 and, thus, the welding/cutting operations may also be referred to as the light source 170. If the torch 20 includes a light source 170, the light source may be positioned within the internal cavity 104 of the torch body 100 or externally of the internal cavity 104 and may have a direct line of sight to interchangeable components or be optically coupled to the operable end of the internal cavity 104 via any optics components, such as mirrors, fiber optics, light pipes, etc. now known or developed hereafter.

Figure 2:
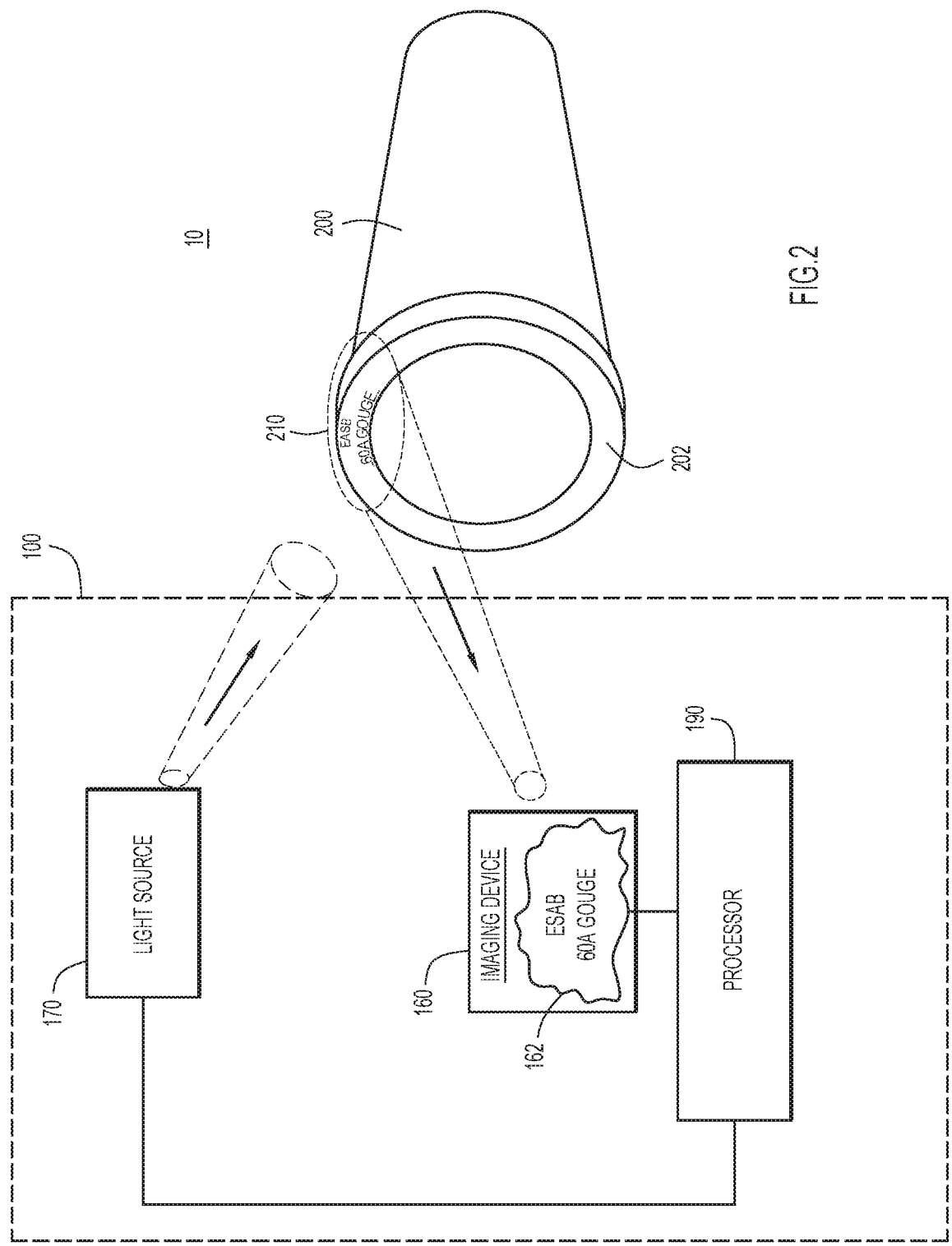
FIG. 2 is a block diagram representation of a portion of the torch illustrated in FIGS. 1A-1C and an interchangeable torch component, according to an example implementation.

Although FIG. 1C illustrates a single imaging device 160 and a single light source 170, in some implementations, the torch 20 may include multiple imaging devices 160. The different imaging devices 160 may each be dedicated to a specific type of interchangeable torch component 200 (e.g., a first imaging device for electrodes, a second imaging device for torch tips, etc.) or to different combinations of consumables. In other implementations, a single imaging device 160 may be suitable for imaging one or more markings 210 (see FIG. 2) included on any components 200 installed onto the torch body 100 (i.e., coupled to the torch body 100). Implementations including multiple imaging devices 160 may also include multiple light sources 170. The light sources 170 may each be dedicated to a single imaging device 160, a set of imaging devices 160, or some combination thereof. Alternatively, a single light source 170 might provide light for any imaging devices 160 included in a torch 20.

Still referring to FIG. 1C, the torch 20 also includes a processor 190. The processor 190 included in the torch body 100 may operate any combination of imaging devices 160 and light sources 170. According to some implementation, the processor 190 identifies the components based on their one or more markings to determine if the components are genuine, and as a result of such a determination directly or indirectly causing a virtual or physical parts-in-place switch to assume a closed position when the components are determined to be genuine and an open position when the components are determined not to be genuine. Compliance indication other than that provided by a physical or virtual switch may also be used to evince whether or not the interchangeable torch components are genuine. As an example, compliance may be indicated by the processor 190 outputting particular data indicative that the interchangeable torch components are genuine.

Figure 3:
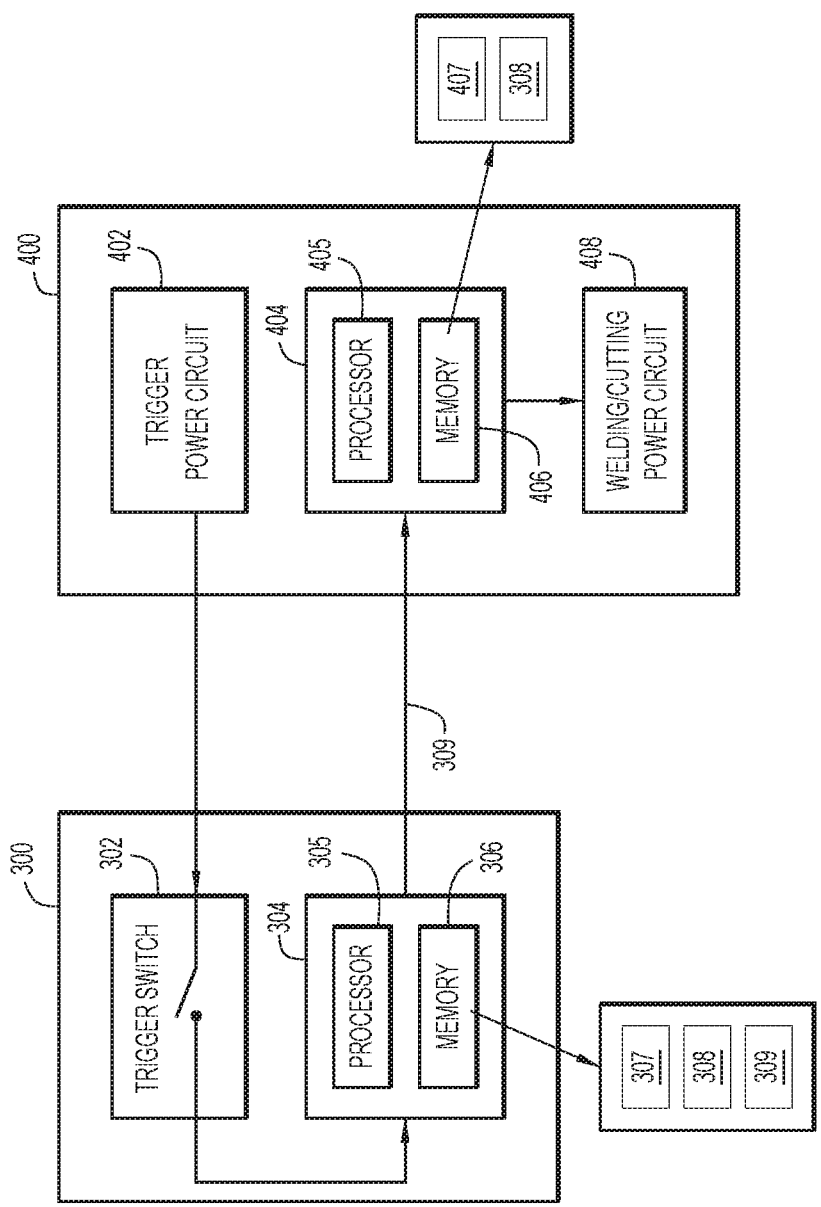
FIG. 3 is a block diagram of a torch assembly and the power supply of FIG. 1A, according to an example implementation of the present disclosure.

FIG. 3 illustrates a block diagram of selected elements of a welding/cutting torch 300 and a welding/cutting power supply 400 that are used in a process of authenticating the torch with the power supply and using the outcome of the authentication to deny or permit the delivery of welding/cutting power to the torch. In instances where the torch 300 comprises a plasma cutting torch, the outcome of the authentication may also concurrently deny or permit the delivery of process gas and shield gas to the torch.

According to one implementation, the torch 300 includes a trigger switch 302 that is influenced by the user of the torch to assume an open or closed position. According to one implementation, the trigger switch 302 physically forms a part of the trigger 105, or may otherwise be coupled to the trigger such that when the trigger 105 is compressed by the user, the trigger switch 302 transitions from an open position, as shown in FIG. 3, to a closed position. According to one implementation, the trigger switch 302 is configured to output an electronic signal that is transmitted to a data module 304 to cause the data module to initiate the authentication process. The trigger switch 302 may also be a virtual switch implemented through the use of software. For example, the trigger 105 of FIG. 1B may be operatively coupled to a data generator that outputs data upon the trigger 105 being compressed by the user and then transmits the data to the data module 304 to cause the data module to initiate the torch/power supply authentication process. In either case, a low voltage trigger power circuit 402 of the power supply 400 provides power to circuitry associated with the physical or virtual trigger switch 302 and data module 304.

According to one implementation, the data module 304 includes a processor 305 (e.g. microprocessor) and one or more memory devices 306 to store a variety of data and software instructions for execution by the processor 305. The one or more memory devices 306 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 306 may comprise one or more tangible (non-transitory) computer readable storage media (e.g., a memory device) encoded with software (e.g., control logic/software comprising computer executable instructions and, when the software is executed by the processor 305, it is operable to perform the operations described herein.

Disclosed herein are a variety of methods of authenticating a welding/cutting torch with a welding/cutting power supply. According to various implementation, authentication is achieved by a trigger authentication process, a parts-in-place authentication process or a combination of both the trigger and parts-in-place authentication processes.

FIGS. 4-7 illustrate methods of carrying out a trigger authentication process according to some implementations. According to one implementation, as shown in FIG. 4A, in step 502 the trigger authentication process is initiated in response to the data module 304 receiving a signal or data from the physical or virtual trigger switch 302 described above. In response, in step 503 the processor 305 obtains from memory 306 trigger authentication data 308 and then at step 504 executes encryption logic 307 to encrypt the authentication data 308 to produce trigger ciphertext 309. Upon the trigger ciphertext 309 being produced, it is sent at step 505 from the data module 304 to an authentication module 404 located in the power supply 400.

According to one implementation, the authentication module 404 includes a processor 405 (e.g. microprocessor) and one or more memory devices 406 to store a variety of data and software instructions for execution by the processor 405. The one or more memory devices 406 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 406 may comprise one or more tangible (non-transitory) computer readable storage media (e.g., a memory device) encoded with software (e.g., control logic/software comprising computer executable instructions and, when the software is executed by the processor 305, it is operable to perform the operations described herein.

Figure 4A:
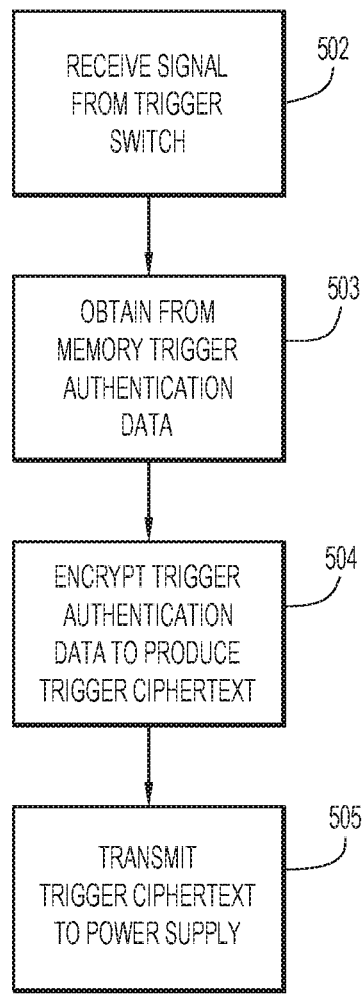
FIG. 4A is a high-level flow chart of a method of producing in a welding/cutting torch trigger ciphertext according to one implementation.
Figure 4B:
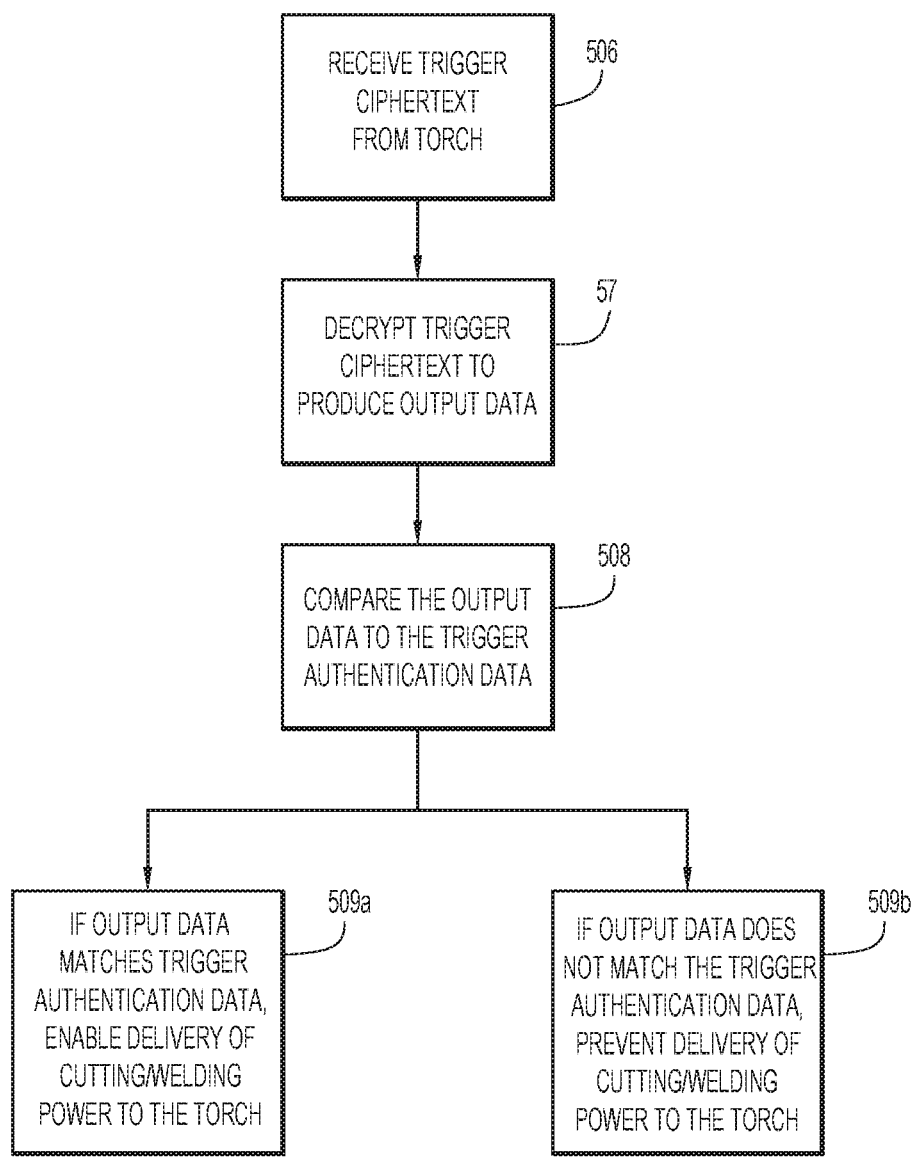
FIG. 4B is a high-level flow chart of an example method of authenticating the torch with the power supply using the trigger ciphertext.

With reference to FIG. 4B, in response to receiving the trigger ciphertext 309 from the torch 300 as shown in step 506, the processor 405 of the authentication module 404 at step 507 executes decryption logic 407 to decrypt the received trigger ciphertext 309. At step 508, the authentication module 404 then compares the output data of the decryption with the trigger authentication data 308 previously stored in memory 406. At step 509*a*, in response to the decryption output data matching the trigger authentication data 308, the power supply welding/cutting power circuit 408 is enabled to deliver high voltage welding/cutting power to the torch 300. However, in step 509*b*, in the event the decryption output data does not match the trigger authentication data 308, the high voltage power supply welding/cutting power circuit 408 is disabled from delivering welding/cutting power to the torch 300. According to one implementation, the enablement and disablement of delivering welding/cutting power to the torch 300 is respectively achieved by the closing or opening of a relay in the welding/cutting power circuit 408.

Figure 5:
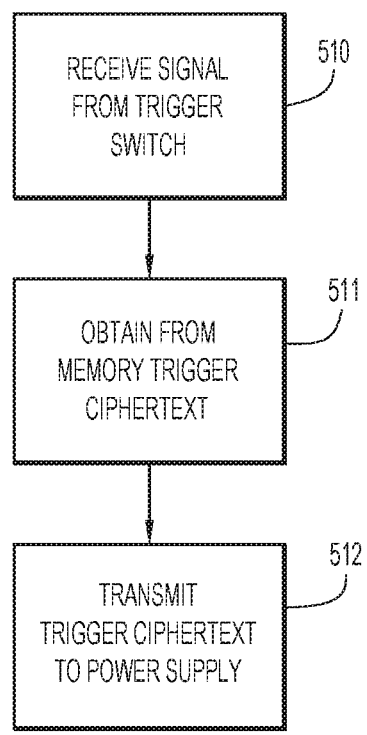
FIG. 5 is a high-level flow chart of a method of obtaining trigger ciphertext according to one implementation.

According to other implementations, the trigger ciphertext 309 is produced outside the torch 300 and then stored in memory 306. Like above, the trigger ciphertext 309 is produced by encrypting trigger authentication data 308. According to such an implementation, the data module processor 305 is free from implementing an encryption algorithm, which has an advantage of reducing the amount of time needed to implement the authentication process. Thus, according to some implementations, as shown in FIG. 5, when the data module 304 receives a signal or data at step 510 indicative of the trigger switch 302 being in a closed position, the processor 305 obtains from memory 306 the trigger ciphertext 309 at step 511 and then transmits the trigger ciphertext to the power supply 400 where it is processed in the authentication module 404 in a manner like that disclosed in FIG. 4B.

Figure 6:
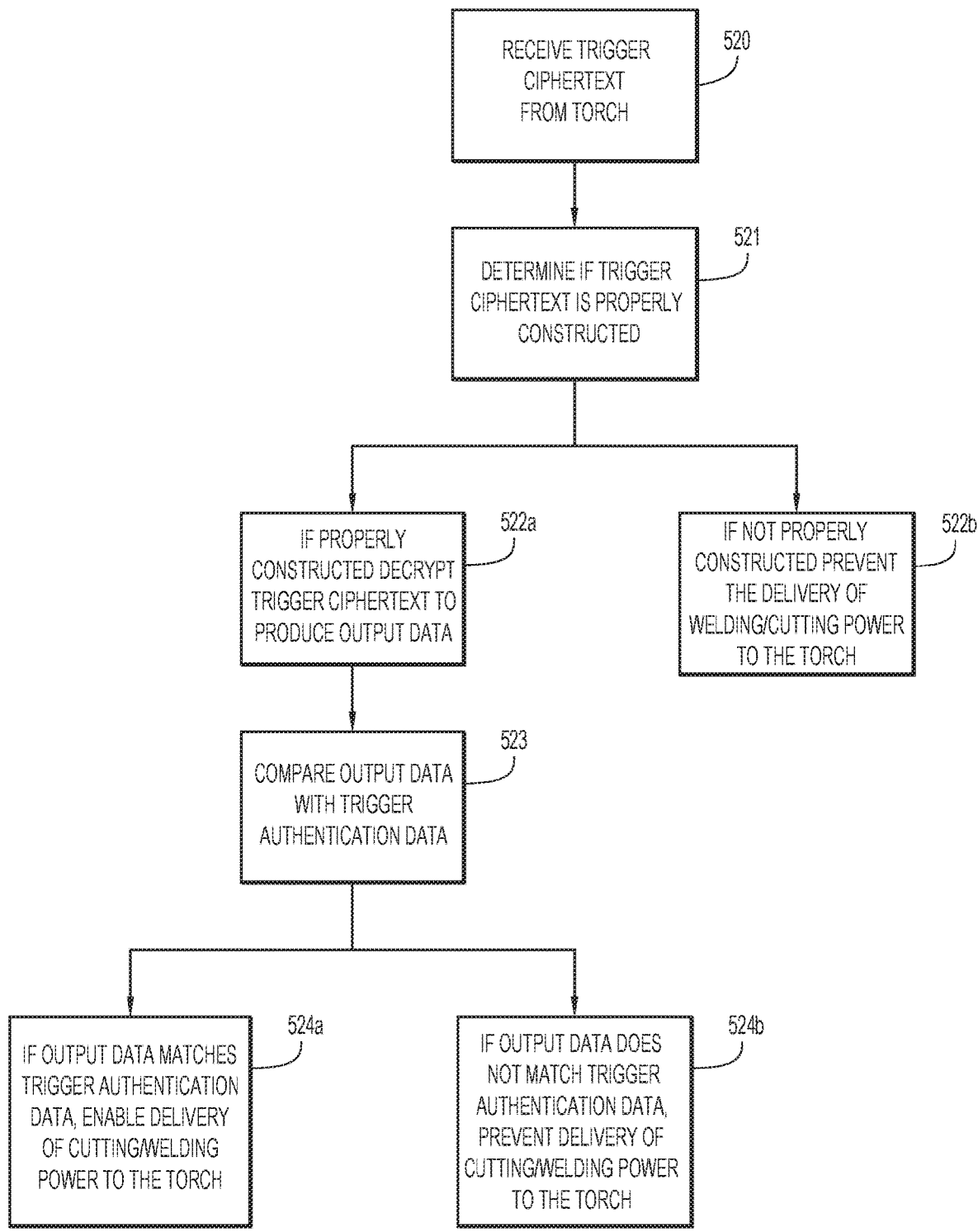
FIG. 6 is a high-level flow chart of a method of authenticating the torch with the power supply according to another implementation.

According to some implementations, an authenticated encryption scheme is used to generate the trigger ciphertext 309. In such instances, as shown in FIG. 6, the authentication process inside the power supply 400 begins by receiving in the authentication module 404 the trigger ciphertext 309 at step 520 and then determining if the trigger ciphertext is properly constructed. If the trigger ciphertext 309 is determined to be properly constructed, steps 522a, 523 and one of 524a and 524b are carried out. Steps 522a, 523 and one of 524a and 524b respectively corresponding to steps 507, 508, 509a and 509b of those disclosed above in conjunction with the description of FIG. 4B. In the event the trigger ciphertext 309 is determined at step 522b not to be properly constructed, the high voltage power supply welding/cutting power circuit 408 of the power supply 400 is disabled from delivering welding/cutting power to the torch 300.

As explained above, another method of authenticating a welding/cutting torch with a power supply is through the use of a PIP switch that is operative to transition from an open position to a closed position when the one or more interchangeable torch components are determined to be genuine.

Figure 7:
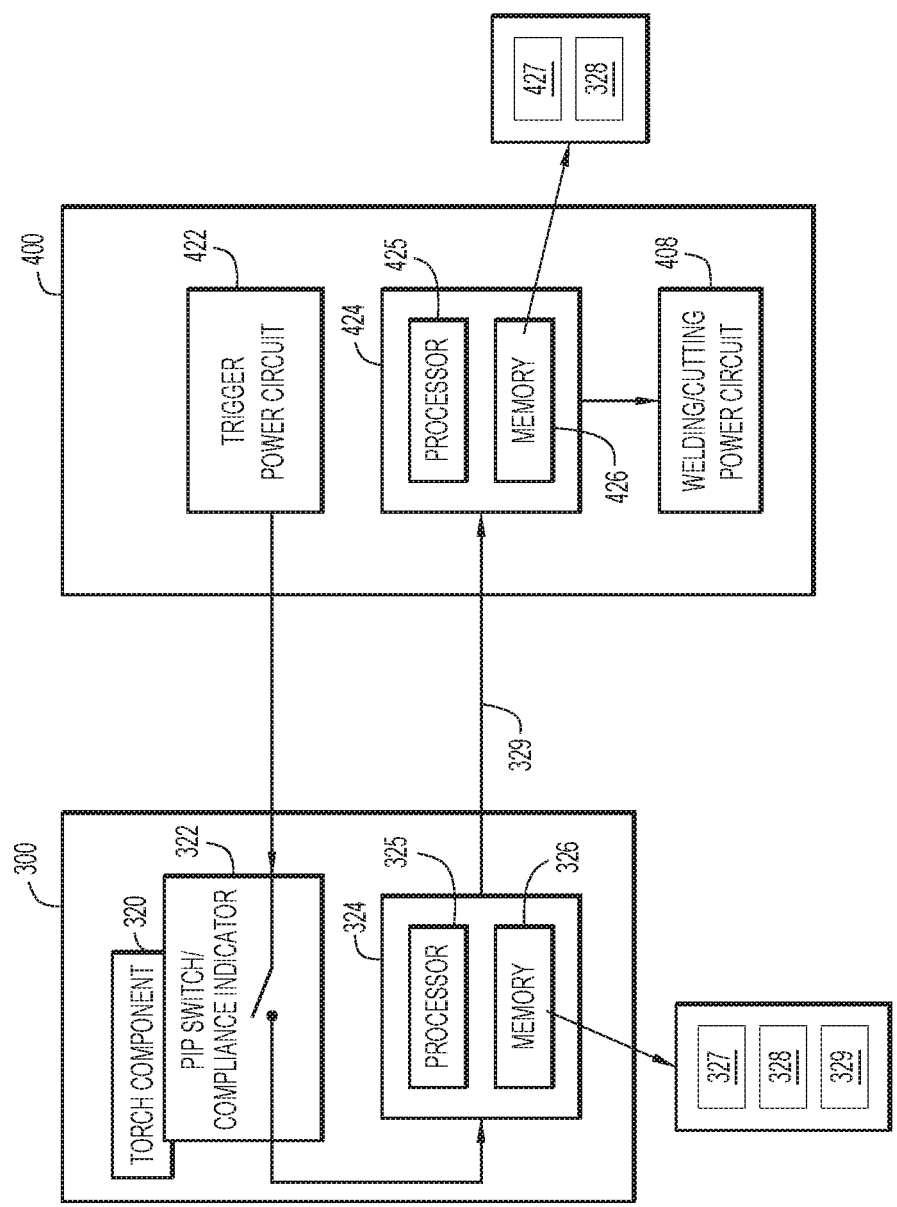
FIG. 7 is a block diagram of a torch assembly and the power supply of FIG. 1A, according to an example implementation.

FIG. 7 illustrates a block diagram of selected elements of a welding/cutting torch 300 and a welding/cutting power supply 400 that are used in a process of authenticating the torch with the power supply and using the outcome of the authentication to deny or permit the delivery of welding/cutting power to the torch. In instances where the torch 300 comprises a plasma cutting torch, the outcome of the authentication may also concurrently deny or permit the delivery of process gas and shield gas to the torch.

According to one implementation, the torch 300 includes the PIP switch 322 that directly or indirectly causes an electronic signal or data to be sent to a data module 324 to cause the data module to initiate a PIP authentication process upon interchangeable torch components 320 of the torch being determined to be genuine. The manner in which the interchangeable torch parts 320 are determined to be genuine may be carried out using the methods described above in association with the FIGS. 1C and 2, or may be carried using any other method now known or later developed. In any case, according to some implementations a low voltage trigger power circuit 422 of the power supply 400 provides power to circuitry associated with the physical or virtual PIP switch.

According to one implementation, the data module 324 includes a processor 325 (e.g. microprocessor) and one or more memory devices 326 to store a variety of data and software instructions for execution by the processor 325. The one or more memory devices 326 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 326 may comprise one or more tangible (non-transitory) computer readable storage media (e.g., a memory device) encoded with software (e.g., control logic/software comprising computer executable instructions and, when the software is executed by the processor 325, it is operable to perform the operations described herein.

Figure 8A:
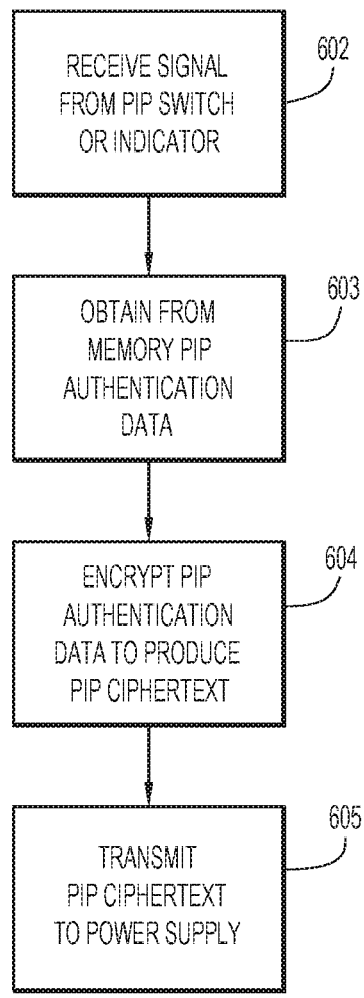
FIG. 8A is a high-level flow chart of a method of producing in a welding/cutting torch parts-in-place ciphertext according to one implementation.

According to one implementation, as shown in FIG. 8A, in step 602 the PIP authentication process is initiated in response to the data module 324 receiving a signal or data from the physical or virtual trigger switch 322 described above. In response, in step 603 the processor 325 obtains from memory 326 PIP authentication data 608, and then at step 604 executes encryption logic 607 to encrypt the authentication data 608 to produce trigger ciphertext 609. Upon the PIP ciphertext 609 being produced, it is sent at step 605 from the data module 324 to an authentication module 424 located in the power supply 400.

According to one implementation, the authentication module 404 includes a processer 425 (e.g. microprocessor) and one or more memory devices 426 to store a variety of data and software instructions for execution by the processor 425. The one or more memory devices 426 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 426 may comprise one or more tangible (non-transitory) computer readable storage media (e.g., a memory device) encoded with software (e.g., control logic/software comprising computer executable instructions and, when the software is executed by the processor 325, it is operable to perform the operations described herein.

Figure 8B:
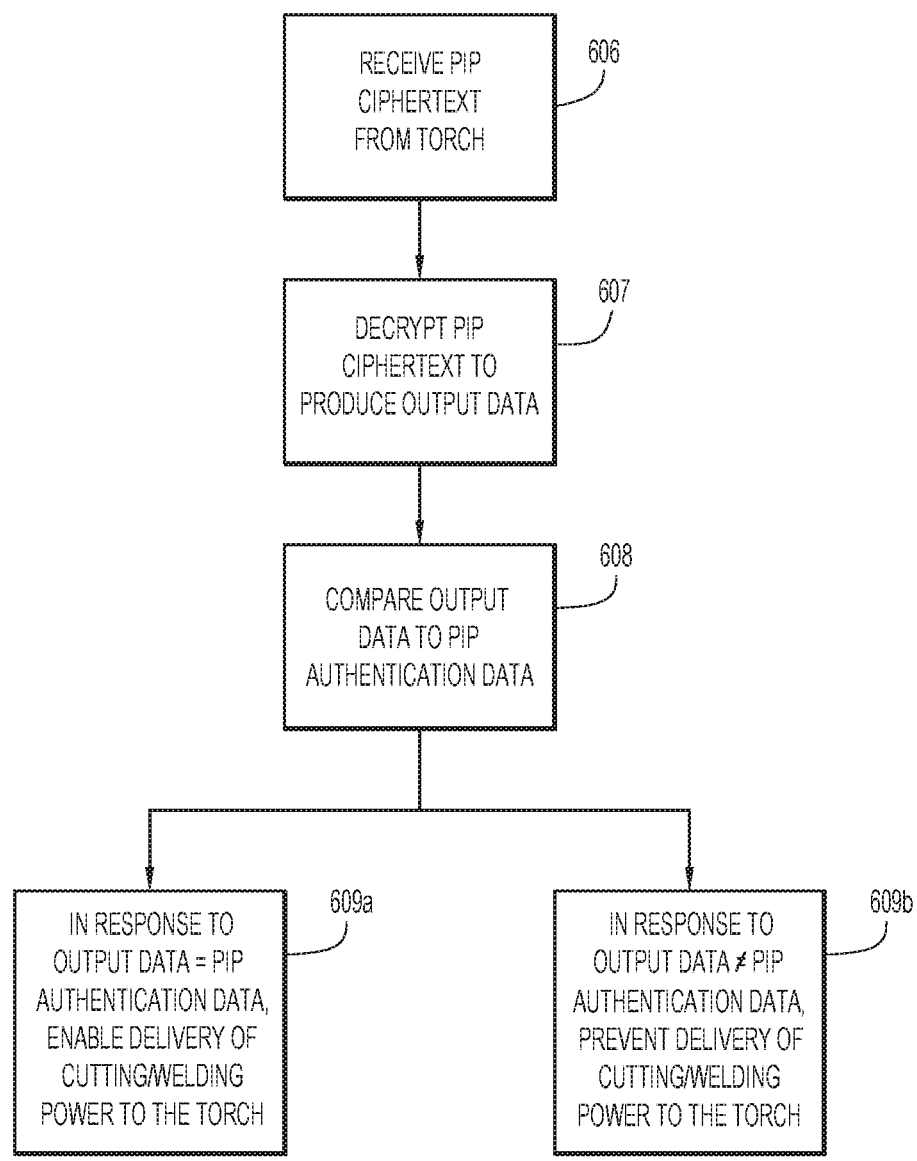
FIG. 8B is a high-level flow chart of an example method of authenticating the torch with the power supply using the parts-in-place ciphertext.

With reference to FIG. 8B, in response to receiving the PIP ciphertext 329 as shown in step 606, the processor 425 of the authentication module 424 at step 607 executes decryption logic 427 to decrypt the received PIP ciphertext 329. At step 608, the authentication module then compares the output data of the decryption with the PIP authentication data 328 previously stored in memory 426. At step 609a, in response to the decryption output data matching the PIP authentication data 328, the power supply welding/cutting power circuit 408 is enabled to deliver high voltage welding/cutting power to the torch 300. However, in step 609b, in the event the decryption output data does not match the PIP authentication data 328, the high voltage power supply welding/cutting power circuit 408 is disabled from delivering welding/cutting power to the torch 300. According to one implementation, the enablement and disablement of delivering welding/cutting power to the torch 300 is respectively achieved by the closing or opening of a relay in the welding/cutting power circuit 408.

Figure 9:
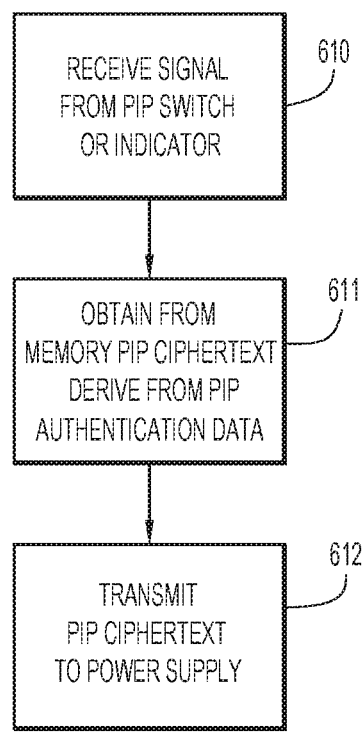
FIG. 9 is a high-level flow chart of a method of obtaining parts-in-place ciphertext according to one implementation.

According to other implementations, the PIP ciphertext 329 is produced outside the torch 300 and then stored in memory 326. Like above, the trigger ciphertext 329 produced outside the torch is done so by encrypting PIP authentication data 328. According to such an implementation, the data module processor 325 is free from implementing an encryption algorithm, which has an advantage of reducing the amount of time needed to implement the PIP authentication process. Thus, according to some implementations, as shown in FIG. 9, when the data module 324 receives a signal or data at step 610 indicative of the PIP switch 322 being in a closed position, the processor 325 obtains from memory 326 the previously produced PIP ciphertext 329 at step 611 and then transmits the PIP ciphertext to the power supply 400 where it is processed in the authentication module 424 in a manner like that disclosed in FIG. 8B.

Figure 10:
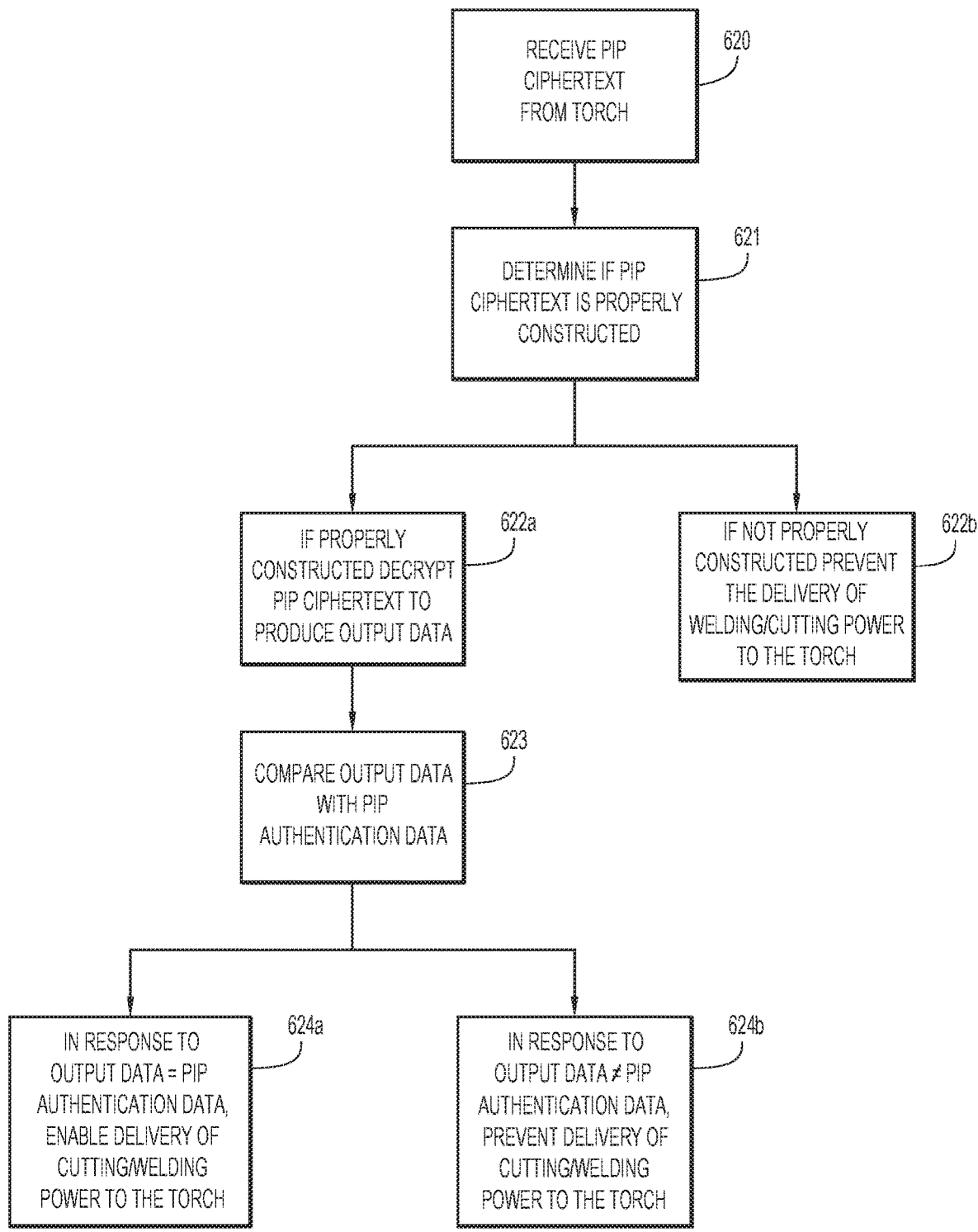
FIG. 10 is a high-level flow chart of a method of authenticating the torch with the power supply according to another implementation.

According to some implementations, an authenticated encryption scheme is used to generate the PIP ciphertext 309. In such instances, as shown in FIG. 10, the PIP authentication process inside the power supply 400 begins by receiving in the authentication module 424 the PIP ciphertext 329 at step 620 and the determining if the PIP ciphertext is properly constructed. If the PIP ciphertext 309 is determined to be properly constructed, steps 622a, 623 and one of 624a and 624b are carried out. Steps 622a, 623, 624a and 624b respectively corresponding to steps 607, 608, 609a and 609b of those disclosed above in conjunction with the description of FIG. 8B. In the event the PIP ciphertext 329 is determined at step 622b not to be properly constructed, the high voltage power supply welding/cutting power circuit 408 of the power supply 400 is disabled from delivering welding/cutting power to the torch 300.

Figure 11:
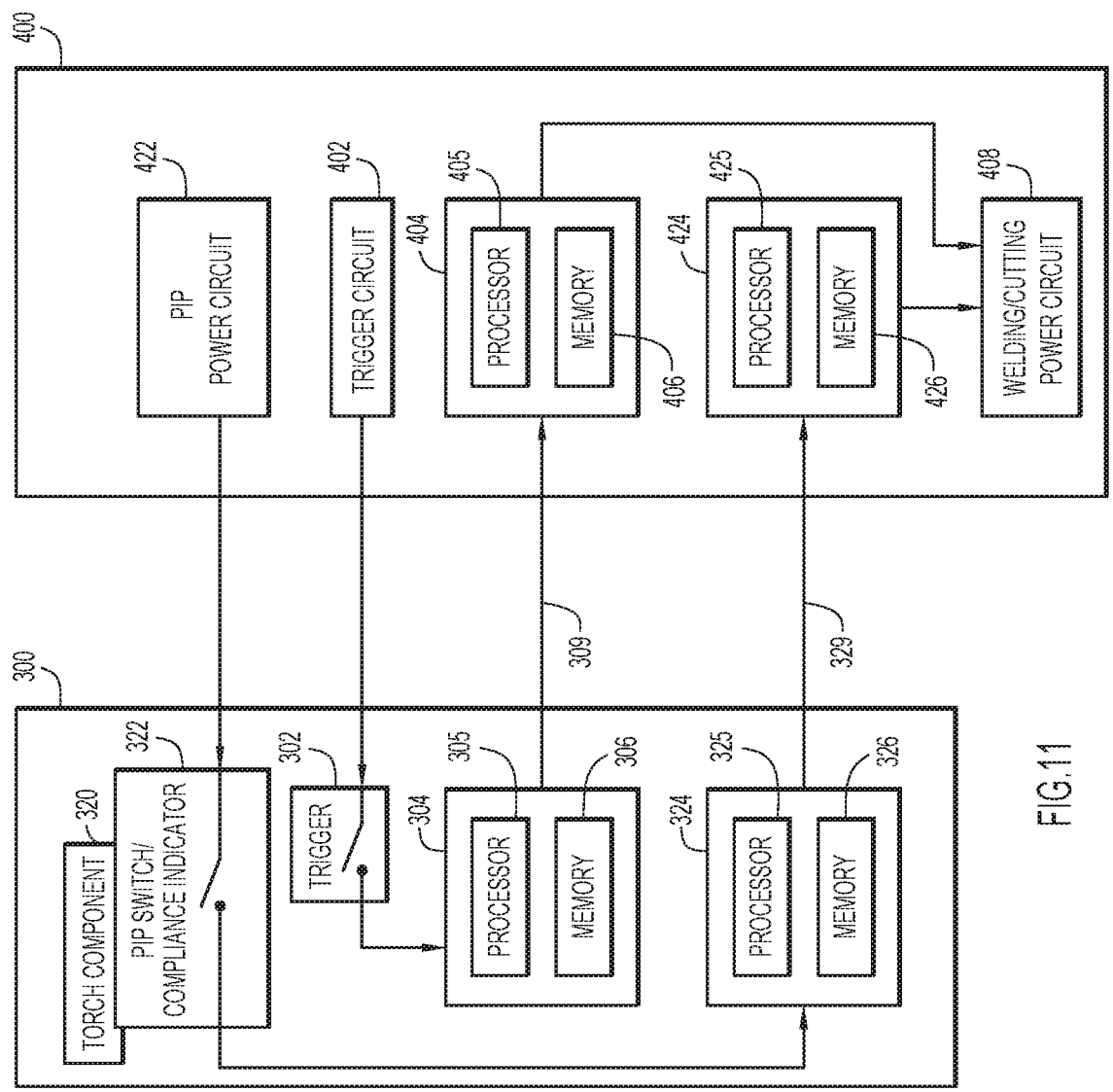
FIG. 11 is a block diagram of a torch assembly and the power supply of FIG. 1A, according to another implementation.
Figure 12:
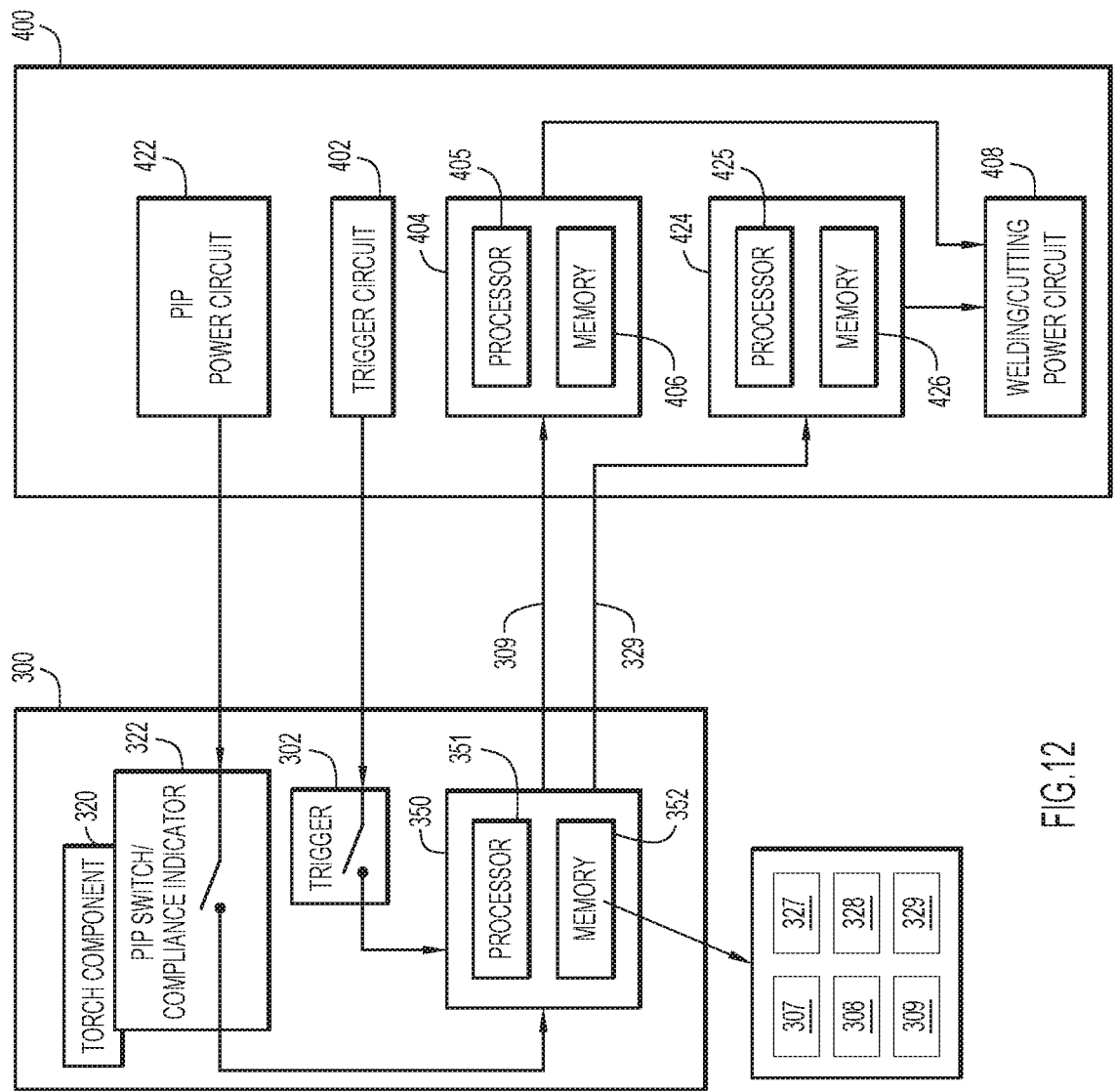
FIG. 12 is a block diagram of a torch assembly and the power supply of FIG. 1A, according to another implementation.

As noted above, according to some implementations authentication of the torch with the power supply is achieved through the use of both a trigger authentication process and a PIP authentication process. According to such implementations, the trigger ciphertext and the PIP ciphertext may be respectively obtained through the use of different data modules 304 and 324 located in the torch as shown in FIG. 11, or a same data module 334 located in the torch as shown in FIG. 12. In instances where data module 304 stores or produces trigger ciphertext, any of the methods associated with the apparatus and methods of FIGS. 3, 4A and 5 may be used. In instances where data module 324 stores or produces PIP ciphertext, any of the methods associated with the apparatus and methods of FIGS. 7, 8A and 9 may be used.

In the implementation of FIG. 11, the trigger authentication module 404 is configured to receive the trigger ciphertext 309 and functions to authenticate the torch 300 with the power supply 400 in accordance with the apparatus and methods of FIGS. 3, 4B and 6 disclosed above. In addition, the PIP authentication module 424 is configured to receive the PIP ciphertext 329 and functions to authenticate the torch 300 with the power supply 400 in accordance with the apparatus and methods of FIGS. 3, 4B and 6 disclosed above. According to some implementations, the welding/cutting power circuit 408 is enabled to deliver welding/cutting power to the torch 300 only upon both a successful trigger authentication and a successful PIP authentication.

According to some implementations, the torch 300 and power supply 400 are configured such that trigger authentication is initiated only upon a successful PIP authentication. According to other implementations, the trigger and PIP authentication processes are implemented simultaneously.

In the implementation of FIG. 12, the torch 300 comprises a data module 350 that includes a processor 351 (e.g. microprocessor) and one or more memory devices 352 to store a variety of data and software instructions for execution by the processor 351. The one or more memory devices 352 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 352 may comprise one or more tangible (non-transitory) computer readable storage media (e.g., a memory device) encoded with software (e.g., control logic/software comprising computer executable instructions and, when the software is executed by the processor 351, it is operable to perform the operations described herein. In the implementation of FIG. 12, the one or more memories 352 store trigger encryption logic 307, trigger authentication data 308, PIP encryption logic 327 and PIP authentication data 328. In implementations wherein the methods of FIGS. 5 and 9 are carried out, the one or more memories 352 may instead contain previously stored trigger and PIP ciphertext 309 and 329 as discussed above.

In any event, upon the data module 350 obtaining the trigger ciphertext 309 and the PIP ciphertext 329, they are respectively transmitted to the trigger authentication module 404 and PIP authentication module 424 in the power supply 400. Thereafter, the trigger authentication module 404 processes the trigger ciphertext 309 in accordance with methods of FIGS. 4B and 6 and the PIP authentication module 424 processes the PIP ciphertext 329 in accordance with methods of FIGS. 8B and 10. According to some implementations, the torch 300 and power supply 400 are configured such that trigger authentication is initiated only upon a successful PIP authentication. According to other implementations, the trigger and PIP authentication processes are implemented simultaneously.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A torch configured to carry out a welding or cutting operation, the torch comprising:
   a trigger switch configured to assume an open position and a closed position; and
   a first data module to which the trigger switch is operatively coupled, the first data module is configured to:
      when an interchangeable consumable component installed on an operative end of the torch is determined to be genuine, receive first data in response to the trigger switch assuming the closed position, produce the first data in response to the trigger switch assuming the closed position or retrieve the first data from a first memory located in the torch in response to the trigger switch assuming the closed position; and
      to thereafter encrypt the first data using a first encryption algorithm to produce trigger ciphertext.

2. The torch according to claim 1, wherein the first data module includes a transmitter that is configured to transmit the trigger ciphertext to a power supply.

3. The torch according to claim 2, wherein the transmitter is configured to wirelessly transmit the trigger ciphertext.

4. The torch according to claim 1, further comprising:
   a parts-in-place switch transitional between an open position and a closed position, when power is supplied to the torch by a power supply, the parts-in-place switch is configured to assume the closed position when the interchangeable consumable component is determined to be genuine, the parts-in-place switch being configured to assume the open position when the interchangeable consumable component is determined to be non-genuine; and
   a second data module to which the parts-in-place switch is operatively coupled, the second data module configured to use a second encryption algorithm to produce parts-in-place ciphertext when the parts-in-place switch is in the closed position.

5. The torch according to claim 4, wherein the second data module includes a transmitter that is configured to transmit the parts-in-place ciphertext to the power supply.

6. The torch according to claim 5, wherein the transmitter is configured to wirelessly transmit the trigger ciphertext.

7. The torch according to claim 4, wherein the first encryption algorithm uses a first key to produce the first data and the second encryption algorithm uses a second key to produce the parts-in-place ciphertext, the second key being different from the first key.

8. The torch according to claim 4, wherein the first encryption algorithm uses a first key to produce the first data and the second encryption algorithm uses the first key to produce the parts-in-place ciphertext.

9. The torch according to claim 1, further comprising:
a parts-in-place switch transitional between an open position and a closed position, when power is supplied to the torch by a power supply, the parts-in-place switch is configured to assume the closed position when the interchangeable consumable component is determined to be genuine, the parts-in-place switch being configured to assume the open position when the interchangeable consumable component is determined to be non-genuine, wherein the parts-in-place switch is operatively coupled to the first data module and the first data module is configured to use an encryption algorithm to produce parts-in-place ciphertext when the parts-in-place switch is in the closed position.

10. The torch according to claim 9, wherein the first data module includes a transmitter that is configured to transmit the parts-in-place ciphertext to the power supply.

11. The torch according to claim 10, wherein the transmitter is configured to wirelessly transmit the parts-in-place ciphertext.

12. The torch according to claim 9, further comprising:
one or more imaging devices disposed within an internal cavity of the torch and positioned to optically acquire an image of or image data representative of one or more markings included on the interchangeable consumable component;
a memory; and
an image processor that executes instructions stored in the memory so that the image processor determines that the interchangeable consumable component is genuine based on a marking of the one or more markings.

13. A welding or cutting system comprising:
a torch including a trigger switch that is transitional between an open position and a closed position, the trigger switch being operatively coupled to a first data generator that, when an interchangeable consumable component installed on an operative end of the torch is determined to be genuine, uses a first encryption algorithm in conjunction with a first encryption key and first data to produce trigger ciphertext when the trigger switch is in the closed position; and
a power supply configured to deliver welding or cutting power to the torch, the power supply including a first authenticating module that is configured to receive and then decrypt the trigger ciphertext by use of a first decryption algorithm that uses the first encryption key to produce first output data, the first authenticating module configured to compare the first output data with the first data, in response to the first output data and the first data being the same, the power supply is enabled to deliver the welding or cutting power to the torch, and in response to the first output data not being the same as the first data, the power supply is configured to prevent delivery of the welding or cutting power to the torch.

14. The welding or cutting system according to claim 13, wherein the torch further comprises:
a parts-in-place switch transitional between an open position and a closed position, the parts-in-place switch being configured to assume the closed position when the interchangeable consumable component is determined to be genuine, the parts-in-place switch being configured to assume the open position when the interchangeable consumable component is determined to be non-genuine, the parts-in-place switch being operatively coupled to a second data generator that uses a second encryption algorithm in conjunction with a second encryption key and second data to produce parts-in-place ciphertext when the parts-in-place switch is in the closed position.

15. The welding or cutting system according to claim 14, wherein the power supply includes a second authenticating module that is configured to receive and then decrypt the parts-in-place ciphertext by use of a second decryption algorithm that uses the second encryption key to produce second output data, the second authenticating module being configured to compare the second output data with the second data, in response to the second output data and the second data being the same, the power supply is enabled to deliver the welding or cutting power to the torch, and in response to the second output data not being the same as the second data, the power supply is configured to prevent delivery of the welding or cutting power to the torch.

16. The welding or cutting system according to claim 14, further comprising:
one or more imaging devices disposed within an internal cavity of the torch and positioned to optically acquire an image of or image data representative of one or more markings included on the interchangeable consumable component;
a memory; and
an image processor that executes instructions stored in the memory so that the image processor determines that the interchangeable consumable component is genuine based on a marking of the one or more markings.

17. A welding or cutting system comprising:
a torch including:
an operative end configured to removably receive an interchangeable torch component; and
a parts-in-place switch transitional between an open position and a closed position, the parts-in-place switch being configured to assume the closed position when the interchangeable torch component is determined to be genuine, the parts-in-place switch being configured to assume the open position when the interchangeable torch component is determined to be non-genuine, the parts-in-place switch being operatively coupled to a data module that uses an encryption algorithm in conjunction with an encryption key and first data to produce parts-in-place ciphertext when the parts-in-place switch is in the closed position; and
a power supply configured to deliver welding or cutting power to the torch, the power supply including an authenticating module that is configured to receive and then decrypt the parts-in-place ciphertext by use of a decryption algorithm that uses the encryption key to produce first output data, the authenticating module configured to compare the first output data with the first data, in response to the first output data and the first data being the same, the power supply is enabled to deliver the welding or cutting power to the torch, and in response to the first output data not being the same as the first data, the power supply is configured to prevent delivery of the welding or cutting power to the torch.

18. The welding or cutting system according to claim 17, wherein the torch further comprises:
a torch body;
one or more imaging devices disposed within an internal cavity of the torch body and positioned to optically acquire an image of or image data representative of one or more markings included on the interchangeable torch component;

a memory; and an image processor that executes instructions stored in the memory so that the image processor determines that the interchangeable torch component is genuine based on a marking of the one or more markings.

\* \* \* \* \*